Figure 1:
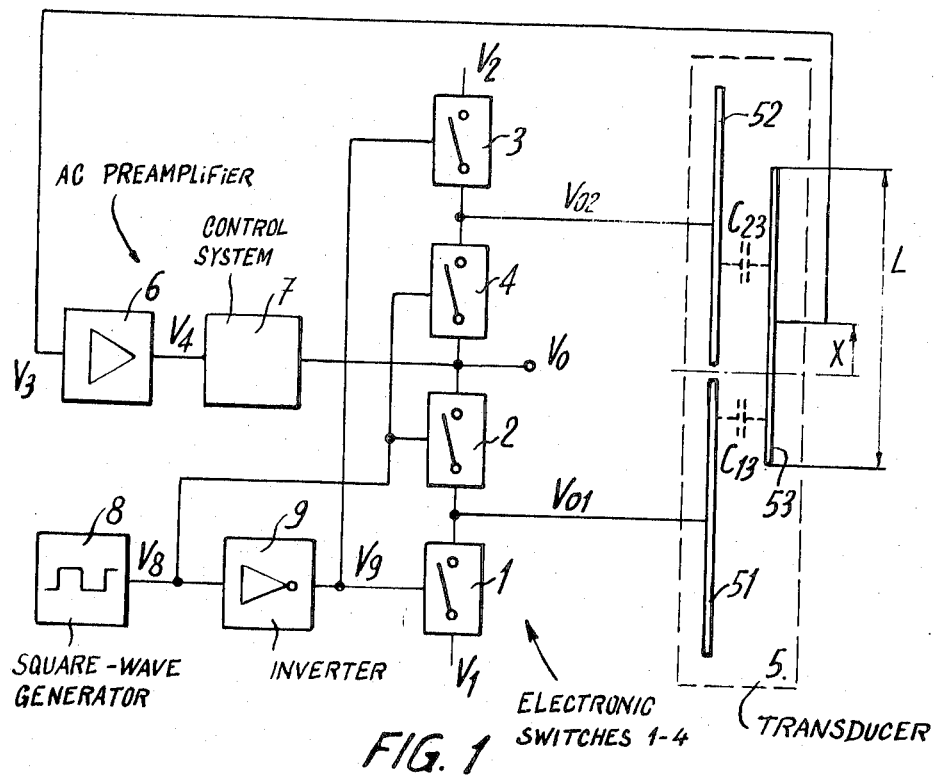

United States Patent [19]
Meyer

[11] 3,857,092
[45] Dec. 24, 1974

[54] ELECTRICAL LENGTH MEASURING SYSTEM

[76] Inventor: Hans Ulrich Meyer, 5, Chemin du Moulin, Morges, Vaud, Switzerland

[22] Filed: Mar. 12, 1973

[21] Appl. No.: 340,065

[30] Foreign Application Priority Data
Mar. 22, 1972 Switzerland.......................... 4241/72

[52] U.S. Cl. .................................. 324/61 R, 318/662
[51] Int. Cl. ............................................. G01r 27/26
[58] Field of Search .................. 324/61 R; 318/662; 317/246

[56] References Cited
UNITED STATES PATENTS

| | | | |
|---|---|---|---|
| 3,009,101 | 11/1961 | Locher | 324/61 R |
| 3,039,051 | 6/1962 | Locher | 324/61 R |
| 3,297,941 | 1/1967 | Wolfendale | 324/61 R X |
| 3,323,699 | 6/1967 | Bricker, Jr. | 324/61 R X |
| 3,340,400 | 9/1967 | Quittner | 324/61 R X |
| 3,631,430 | 12/1971 | West | 324/61 R X |
| 3,688,190 | 8/1972 | Blum | 324/61 R |
| 3,688,206 | 8/1972 | Eide | 324/61 R X |

Primary Examiner—Stanley T. Krawczewicz
Attorney, Agent, or Firm—Emory L. Groff; Emory L. Groff, Jr.

[57] ABSTRACT

An electrical length measuring system employs a differential capacitor transducer, wherein one side of the capacitor has a receiving plate and the other side has two transmitting plates, the two sides being relatively movable in parallel. The transmitting plates are intermittently connected to the output of a control system whose input receives a feedback of the alternating voltage picked up by the receiving plate such that the signal of the latter is always driven back to zero, whereby to ensure a linear variation of the output voltage of the control system with plate displacement.

12 Claims, 7 Drawing Figures

ELECTRICAL LENGTH MEASURING SYSTEM

This invention relates to a capacitive length measuring system.

There have been proposed a number of capacitive length measuring systems using transducers of differential capacity type. In one known system disclosed in German Pat. No. 953,745 there are provided two fixed electrodes (capacitor plates) and a movable electrode. Each fixed electrode is connected to a respective sinusoidal voltage source, the difference in phase between the voltages being 180°. The signal picked up by the movable electrode is conditioned by a high input impedance amplifier and demodulated by a synchronous demodulator, so as to obtain a direct current signal the voltage of which is in a linear relationship with the position of the movable electrode. One drawback of this system is that the movable electrode is shunted by the cable capacitance which is dependent on the cable length and its deformation, and which has to be compensated either by a large change in capacity of the transducer over the useful range, or by a capacitive feedback over the amplifier partially compensating the signal variation due to the variation in cable capacitance, or both. Another drawback is the difficulty of generating a sinusoidal voltage having a constant amplitude without using prohibitively costly means. Still another drawback arises due to the necessity of having a highly linear relationship between the amplitude of the sinusoidal signal at the input of the demodulator and the voltage of the DC signal at its output. This puts high design constraints on the demodulator if an accuracy of a thousandth of the full scale signal, or better, is to be achieved.

It is an object of the invention to provide an electrical length measuring system which avoids or at least reduces the above-described drawbacks. It is another object of this invention to seek to provide an electric length measuring system of high accuracy, linearity and resolution and needing only small changes in capacity when compared with similar known systems. It is yet another aim of this invention to make it possible to reduce the physical dimensions of the transducer, and make it also suitable for economically measuring longer lengths by using several capacitor plates which are sequentially connected to the electronic circuitry by electrical or electronic means.

The transducer of the system according to this invention, described below, employs an electrode which is movable relatively to a pair of fixed electrodes in such a way as to obtain a linear relationship between the differential capacitance of the differential capacitor and the displacement which is to be measured.

According therefore to the present invention, there is provided an electrical length measuring system comprising a differential capacitor transducer having on one side at least one receiving plate, and on the other side at least two transmitting plates, the sides being movable relatively to and parallel with each other, each transmitting plate being connectable by switching means alternately between the output voltage of a control system and one of two reference DC voltages, means for feeding back the alternating voltage picked up by the or each receiving plate resulting from relative movement between the plates to the input of the control system in such a way that the signal on the or each receiving plate is driven back to zero to ensure that the output voltage of said control system is in a linear relationship with the relative displacement of the plates of the transducer.

It will be appreciated that the invention as set forth avoids or reduces the obstacles of generating a sinusoidal voltage having a constant amplitude and of a highly linear demodulation by replacing that voltage by choppered voltages and a null-seeking method, a combination resulting in a higher system accuracy. As the amplitude of the voltage picked up by the receiving plate becomes of negligible importance, the influence of the capacity of the connecting cable becomes negligible too.

Figure 2:
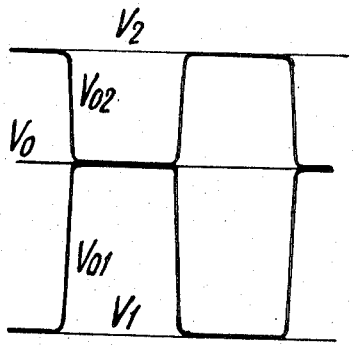
Figure 3:
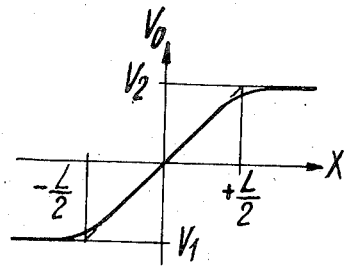
Figure 4:
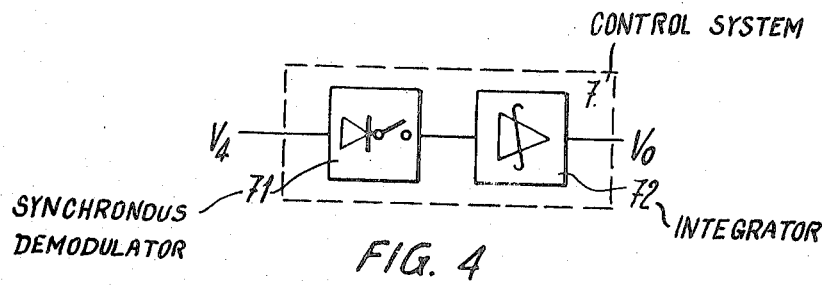
Figure 5:
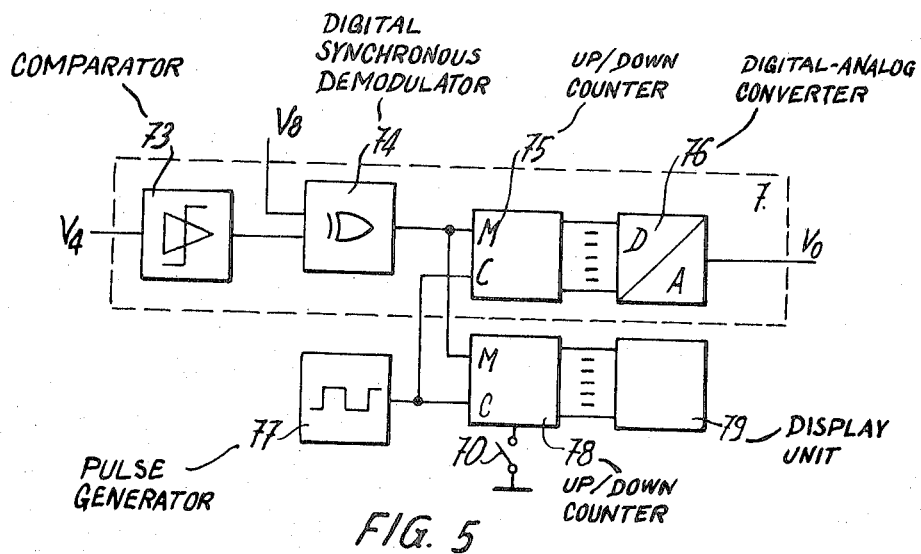
Figure 7:
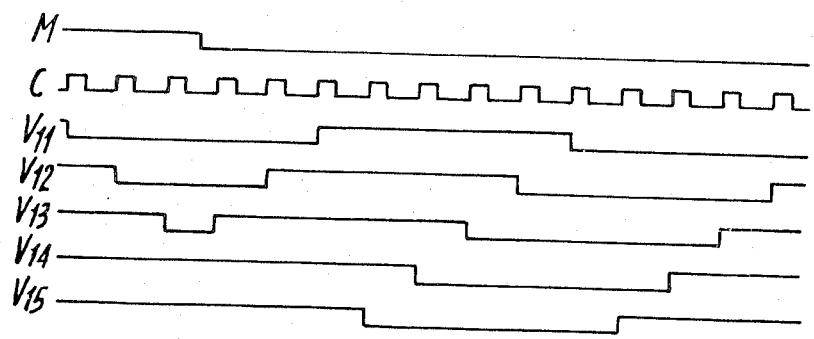
Figure 6:
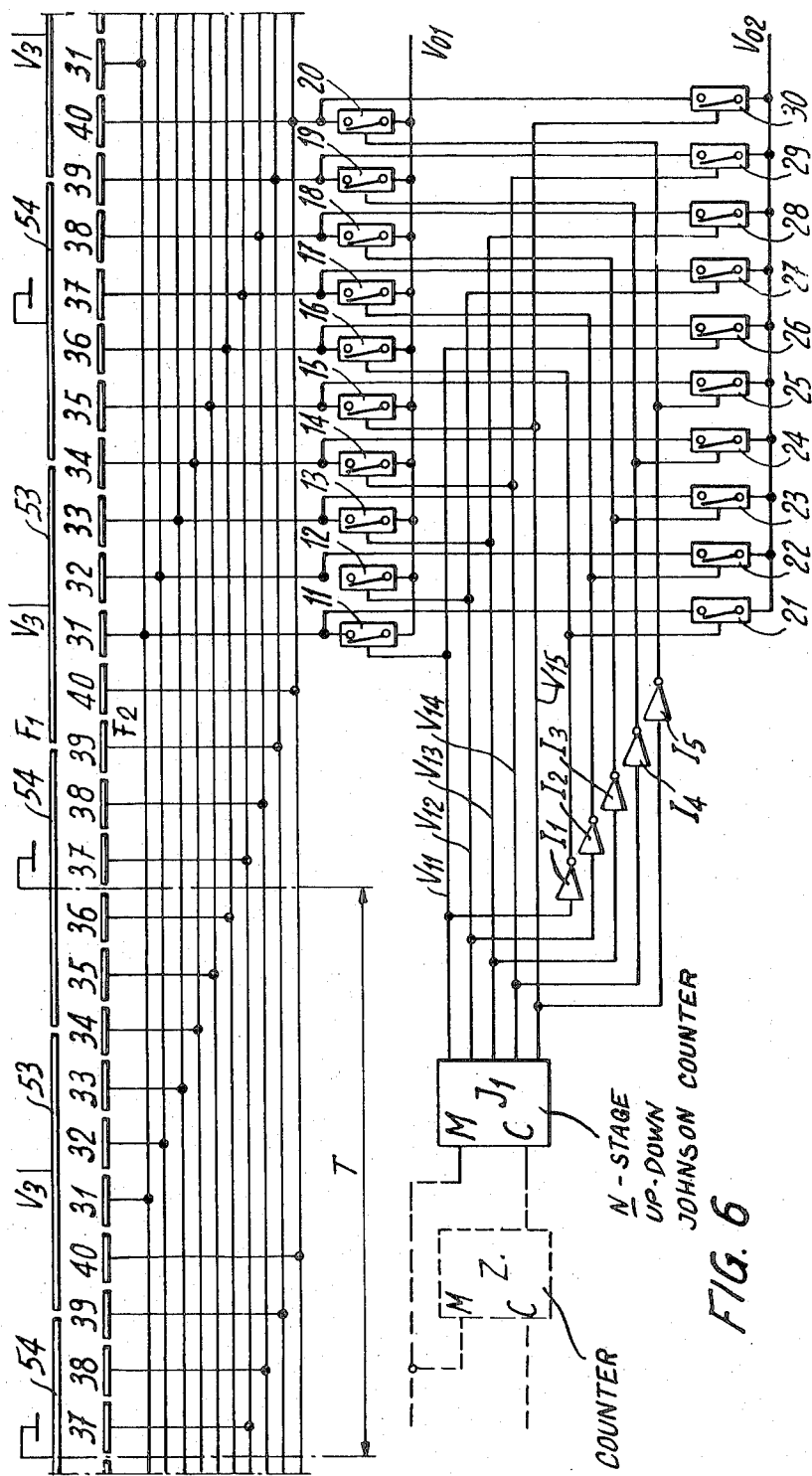

The invention is described in greater detail and by way of example only with reference to the accompanying drawings, wherein FIG. 1 is a block diagram of an electric length measuring system according to the invention, FIG. 2 shows the voltage waveform on the transmitting plates of the transducer shown in FIG. 1, FIG. 3 shows the ideal and real measuring curves of the system, FIG. 4 is an example in block diagram form, of an analog control system embodied in this invention, FIG. 5 shows an example, in block diagram form, of a digital-analog control system embodied in this invention, FIG. 6 is a diagrammatic illustration of an extended system for measuring greater lengths, and FIG. 7 is a voltage diagram of the outputs of the counter shown in FIG. 6.

As shown in FIG. 1, a transducer 5 indicated by dotted lines has fixed transmitting plates 51 and 52, and a receiving plate 53 displaceable parallel to the transmitting plates. The receiving plate 53 is connected to any part the movement of which is to be gauged, or the displacement of which is to be measured. Plate 53 is arranged to move back and forth vertically, as viewed in FIG. 1, with respect to transmitting plates 51 and 52 and as indicated by line A-B, FIG. 1. A corresponding arrangement is shown in U.S. Pat. No. 3,566,222, wherein capacitor plate 3 moves longitudinally with respect to opposite capacitor plates 1 and 2 for capacitive displacement gauging. Also, in German Pat. No. 953,745, capacitor plate 14 is arranged to move longitudinally with respect to plates 11 and 12 for capacitative displacement gauging. Capacitor plates 51, 52 and 53 are connected in a balanced circuit with electronic components 1 to 9 herein described. Longitudinal movement of plate 53 causes an unbalance of the circuit, which is then automatically compensated and results in a change of voltage at $V_o$ (FIG. 1). This voltage may be shown on a calibrated scale (of a voltmeter) to indicate the length measurement of the displacement of plate 53. Means are also provided to show the displacement in the digital binary system or in the analog system or in a display unit, as shown in FIG. 5. The transmitting plate 51 is connected by means of a first electronic switch 1 to a reference DC voltage $V_1$, and by means of a second electronic switch 2 to the output of a control system 7, described later. The other transmitting plate 52 is connected by a third electronic switch 3 to a second reference DC voltage $V_2$, and by means of a fourth electronic switch 4, also to the output of the control system 7. It may be remarked that one of the reference voltages $V_1$ or $V_2$ may be zero. The electronic switches 1, 2, 3 and 4 are of the field-effect type (FET) shown on page 39 of the publication "RCA Digital Integrated Circuits," CD 4016A Types RCA File No. 479, Mar. 1971. RCA Solid State Division.

The electronic switches are controlled by a squarewave generator 8 of the type shown in the publication, "National Semi-Conductor Corporation, Linear Integrated Circuits." National Semiconductor Corporation, 2900 Semi-conductor Drive, Santa Clara, Calif., 95051, 1971. and by an inverter 9 of the type shown on page 322 of the publication, "Millman and Taub, Pulse, Digital and Switching Waveforms." McGraw-Hill 1965 connected to the generator 8 in such a way that during one part of the period of the generator 8 the switches 1 and 3 are conducting, respectively connecting the transmitting plates 51 and 52 to the reference voltages $V_1$, $V_2$ and, during the other part of the period, the switches 2 and 4 are conducting, connecting both transmitting plates 51, 52 to the output of the control system 7.

FIG. 2 shows the voltages $V_{01}$ and $V_{02}$ on the transmitting plates. The voltage $V_0$ is the output voltage of the control system 7. Where the switches show no residual or saturation voltages, which is the case, for example, with field-effect analog switches, the voltages $V_{01}$ and $V_{02}$ on the transmitter plates are going to take values alternating between $V_0$ and $V_1$, and $V_0$ and $V_2$, respectively.

Let $L$ be the length measured in the direction of translation of the receiving plate 53 of the transducer 5, and $X$ the amount of displacement between the transmitting plates and the receiving plate. $X$ is zero in the median position, i.e., when both partial capacities $C_{13}$ and $C_{23}$ (see FIG. 1) are equal. It is also assumed that the perpendicular distance between the plates 51, 52 on the one hand and the plate 53 on the other hand stays constant. Then one has the following relation between the displacement $X$ and the ratio of the partial capacities $C_{13}$ and $C_{23}$:

$$C_{13}/C_{23} = (L/2 - X)/(L/2 + X)$$

This is true as long as $X$ is smaller than $L/2$ and if one neglects edge effects.

Changing the voltage $V_{01}$ from $V_0$ to $V_1$ induces the following charge on the receiving plate:

$$Q_1 = C_{13}(V_1 - V_0)$$

but simultaneously $V_{02}$ changes from $V_0$ to $V_2$ and induces a charge $$Q_2 = C_{23}(V_2 - V_0)$$

If the total induced charge is equal to zero, that is:

$$Q_1 = -Q_2$$

then one has no induced voltage jump on the receiving plate, in other words no induced alternating voltage $V_3$. In that case one has the relation:

$$V_0 = (½ - X/L) V_1 + (½ + X/L) V_2$$

Thus, in the case of no induced voltage $V_3$, $V_0$ is a linear function of the displacement $X$. The real function is shown by FIG. 3. Theoretically one should obtain a straight line between the limits of displacement $X = -L/2$ and $X = +L/2$. However, owing to edge effects, which are geometry-dependent, slight deviations arise near the limits. This can easily be corrected by making $L$ larger than the measuring range, and by choosing a sufficiently small distance between the plates.

In the described system the voltage $V_0$ is automatically set to a value driving the induced voltage $V_3$ on the receiving plate to zero. The receiving plate 53 is connected directly, or coupled capacitively, to the input of an AC pre-amplifier 6 of the type shown on page 623 of the publication, "Doebelin, Measurement Systems, Application and Design." McGraw-Hill 1966. This pre-amplifier 6 acts as an impedance-converter to avoid loading the induced voltage $V_3$ and to protect the input signal from transients or back effects arising in the subsequent circuitry. The output of the pre-amplifier 6 is connected to the input of the control system 7. This control system 7 has the task of changing its output voltage $V_0$ in such a way as to drive the alternating voltage induced on the receiving plate 53 to zero. Thus, if one displaces the receiving plate 53, the output voltage $V_0$ of the control system will be adjusted in such a manner as to drive the induced voltage back to zero.

The following circuits are given as preferred examples of such a control system.

A first circuit is shown in FIG. 4. The output AC voltage $V_4$ of the pre-amplifier 6 is fed to a synchronous demodulator 71 of the type shown in the middle Figure on page 662 of the Doebelin publication. The polarity of the output voltage of this synchronous demodulator 71 is given by the phase of the input voltage. An integrator 72 of the type shown in FiG. 14–19($a$) on page 537 of the Millman and Taub publication connected to the demodulator 71 changes its output voltage in a sense given by the polarity of the output voltage of the demodulator. If the synchronous demodulator 71 is controlled by the correct phase, the control system 7 will always adjust its output voltage $V_0$ in such a way as to drive the induced AC voltage $V_3$ on the receiving plate back to zero.

A modification of the described control system may consist in replacing the integrator 72 an example of which is shown in the publication, "Burr-Brown Handbook of Operational Amplifier Applications." Burr-Brown Research Corporation. P.O. Box 11400, Tucson, Arz. 85706 1963, page 52, bottom Figure by a difference integrator, i.e., by an integrator which integrates the difference between two input signals. The circuitry of a difference integrator is well-known in itself and thus it is not considered necessary to describe it here in detail. Both inputs of the difference integrator are connected to a respective synchronous demodulator. The inputs of both synchronous demodulators are connected to the output of the pre-amplifier 6, and thus to the alternating voltage $V_4$, and both synchronous demodulators are driven with opposite phases. This simple circuit acts as a narrow bandpass filter, thus giving excellent noise rejection.

The measuring accuracy of the system makes it suitable for digital measurements. Such measurements are made possible by a following analog-digital converter. But the control system may also be designed in such a way that it simultaneously fills the function of an analog-digital converter one type of which is shown in the publication, "Hybrid Systems Corporation, Digital to Analog Converter Handbook." Hybrid Systems Corp., 95 Terrace Hall Avenue, Burlington, Mass. 1970, page 7. An example of this is shown in FIG. 5.

In FIG. 5, the output of the pre-amplifier is connected to the input of a comparator 73 of the type shown on page 257 of the Millman and Taub publication. The output voltage of the comparator 73 is compared to a reference voltage $V_8$, delivered by the square-wave generator 8, in a digital synchronous demodulator 74 of the type shown on page 327 of the Millman and Taub publication, consisting, for example, of an exclusive/OR gate, and an up/down counter 75 connected to the gate output counts up or down depending on the logic state at the output of said gate 74. The counting frequency is determined by a pulse generator 77 which may be a square wave generator shown in the National Semi-conductor Publication, page 58, bottom central figure. The output of the counter 75 is fed to a digital-analog converter 76 and the obtained voltage is the output voltage $V_O$ of the control system.

The digital value of $V_O$ could be read directly from the counter 75. However, it is of advantage to connect the inputs of a second up/down counter 78 to the same gate 74 and to the same pulse generator 77, and to connect the output of this counter 78 to a decoder-driver display unit 79. This embodiment has two advantages: firstly, the second counter can be reset to zero or to a chosen number in any position by a switch 70, and secondly, the first counter may be binary, which is more suitable for the digital-analog converter, while the second counter counts in a decimal code, which is more practical for the readout.

The accuracy of the system, combined with the simple mechanical construction of the transducer, makes it possible to extend the measuring range by employing a series of plates which are sequentially connected. FIG. 6 shows how the system can be extended for the measurement of large displacements. The transducer consists, as before, of two opposite surfaces $F_1$ and $F_2$ movable relatively to and in parallel with each other.

The first surface $F_1$ consists of a number of alternate plates 53 and 54, respectively. One-half (53) of the plates is connected directly, or by capacitive coupling, to the pre-amplifier 6, the other half (54) of the plates is grounded in such a way that one grounded plate is always followed by a plate connected to the pre-amplifier and vice versa. Let $T$ be the distance separating the middle of the plates connected to the same point. On the opposite surface $F_2$ there is a number of plates distributed at the rate of $2N$ plates to an interval of $T$, $N$ being a positive integer. In FIG. 6, for example, $N = 5$. All transmitting plates having a centre distance equal to $T$ form a plate group and are connected together. The $2N$ plate groups designated by 31 to 40 are now connected in such a manner to the previously described alternating voltages $V_{01}$ and $V_{02}$ that there are always $N$ consecutive plates connected to $V_{01}$ and the next $N$ plates connected to $V_{02}$. This is realized by the $2N$ analog swithches 11 to 20 which connect the $2N$ plate groups to the alternating voltage $V_{01}$, and the $2N$ other analog switches 21 to 30, connecting the same plate groups 31 to 40 to the alternating voltage $V_{02}$. Switches 11 to 30 are controlled in such a way that there are always $N$ successive plates connected to the same alternating voltage, thus forming, considered electrically, effectively one transmitting plate of length $T/2$. The second plate, considered electrically, is formed by the $N$ next plates and so on. For a given distribution of the plate groups 31 to 40, one has a measuring range equal to $T/2N$. By passing over the limits of this range in a given direction, the distribution of the plates will be displaced in the same way. If, for example, plate groups 33, 34, 35, 36 and 37 are connected to $V_{01}$, and plate groups 38, 39, 40, 31 and 32 to $V_{02}$, and if the surface $F_1$ is moved relatively to the surface $F_2$ in FIG. 6 to the right (as viewed); the next distribution will see the plate groups 34, 35, 36, 37 and 38 connected to $V_{01}$, and the plate groups 39, 40, 31, 32 and 33 connected to $V_{02}$. The control logic of the analog switches 11 to 30 is simple. If the limit of a single measuring range is exceeded, a signal, generated, for example, by the overflow of the counter contained in the control system or in the analog-digital converter, advances a special purpose up/down counter $J_1$ by one count. In other words, both counters are cascaded. The counter $J_1$ is an $N$-stage up/down Johnson counter. Counter $J_1$ is cascaded to the counter Z, which may be the same as the counter 75 in FIG. 5. This counter will overflow, i.e., give a "carry-out" signal when it is about to make a transition from an output of all ones to an output of all zeros or vice versa, thus signaling that an out-of-range condition arises, which has to be remedied by changing the electrical distribution to the plates 31 to 40 in FIG. 6, by means of the Johnson counter $J_1$.

FIG. 7 shows a typical voltage diagram of a five-stage Johnson counter. The signal at the M input determines the counting direction, the one at the C input the counts. $V_{11}$ to $V_{15}$ are the output states or voltages at the five outputs. These outputs are controlling on one hand, the switches 11 to 15 and 26 to 30, (FIG. 6), and, on the other hand, are fed to the inverters $I_1$ to $I_5$, which control the switches 16 to 20 and 21 to 25. In that manner one obtains the desired connection pattern of the plates.

I claim as my invention:

1. Electrical length measuring system comprising a differential capacitor transducer, at least one receiving plate on one side of the capacitor, at least two transmitting plates on the other side of the capacitor, means for moving the sides of capacitor relatively to and in parallel with each other; a control system having an input and an output; a plurality of reference DC voltage sources; switching means for alternately connecting each transmitting plate between the output voltage of the control system and one of the reference DC voltage sources, means for feeding back the alternating voltage picked up by the receiving plate as a result of relative movement between said plates to the input of the control system in such a way that the signal on said at least one receiving plate is driven back to zero whereby to ensure that the output voltage of said control system is in a linear relationship with the relative displacement of the plates of said capacitor.

2. Electrical length measuring system as defined in claim 1, in which an electronic switch is connected to each transmitting plate, a square wave source and an inverter for driving said electronic switches in such a manner that during one part of the period of the square wave source both transmitting plates are connected to the output voltage of the control system, and during the other part of the period to a respective said reference voltage.

3. Electrical length measuring system as defined in claim 1 wherein one of said reference voltages is zero.

4. Electrical length measuring system as defined in claim 2, in which the electronic switches are of the field effect type.

5. Electrical length measuring system as defined in claim 1, in which a high input impedance pre-amplifier is coupled to said at least one receiving plate.

6. Electrical length measuring system as defined in claim 1, in which the control system consists of a synchronous demodulator and an integrator connected thereto.

7. Electrical length measuring system as defined in claim 1, in which the control system consists of two synchronous demodulators and a difference integrator, there being means for driving said demodulators by opposite phases, the output of said demodulators being connected to the inputs of the difference integrator.

8. Electrical length measuring system as defined in claim 1, in which the control system consists of a comparator, a digital synchronous demodulator connected to the output of said comparator, an up/down counter the mode input of which is connected to the output of the digital synchronous demodulator, and a digital-analog converter connected to receive the output of said counter.

9. Electrical length measuring system as defined in claim 8, in which a further counter has its mode input connected to the output of said digital synchronous demodulator, said further counter being independently settable to zero or a predetermined number, a display/information processing unit being connected to said further counter.

10. Electrical length measuring system as defined in claim 1, in which a plurality of consecutive plates of equal length forms the transmitting side of the transducer, switch means for connecting said plates in such a way that several consecutive plates belong to a group having the same electrical potential, and means for displacing electrically the group so as to track the displacement to be measured.

11. Electrical length measuring system as defined in claim 10, in which the receiving side of the transducer is also formed by a plurality of consecutive plates, receiving plates alternating with grounded plates, the distance separating the middle of two consecutive receiving plates being equal to $2N$ times the distance separating the middle of two consecutive transmitting plates, where $N$ is a positive integer, and in which analog switches connect the transmitting plates to one of two alternating voltages, generated by switching between the output voltage of the control system and one of the said reference voltages, control circuitry for controlling the analog switches in such a way that there are always $N$ adjacent transmitting plates connected to one of said alternating voltages, and the next $N$ adjacent transmitting plates connected to the other, and that by moving the transmitting plates relatively to the receiving plates by the amount of the centre distance between two transmitting plates, the electrical distribution pattern of the transmitting plates will be moved by the same amount.

12. Electrical length measuring system as defined in claim 11, wherein an up/down Johnson counter and several inverters connected to the output of said Johnson counter constitute said control circuitry so as to insure a correct electrical distribution pattern of the transmitting plates, and means for feeding a logic signal to said Johnson counter in order to alter the distribution pattern of the transmitting plates by a predetermined amount.

* * * * *